(12) United States Patent
Hsu et al.

(10) Patent No.: US 11,327,228 B2
(45) Date of Patent: May 10, 2022

(54) PHOTONIC DEVICE AND FABRICATION METHOD THEREOF

(71) Applicant: TAIWAN SEMICONDUCTOR MANUFACTURING CO., LTD., Hsinchu (TW)

(72) Inventors: Sui-Ying Hsu, New Taipei (TW); Yueh-Ying Lee, Hsinchu (TW); Chien-Ying Wu, Hsinchu (TW); Chen-Hao Huang, Taoyuan (TW); Chien-Chang Lee, Miaoli County (TW); Chia-Ping Lai, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 4 days.

(21) Appl. No.: 16/925,273

(22) Filed: Jul. 9, 2020

(65) Prior Publication Data

US 2022/0011511 A1    Jan. 13, 2022

(51) Int. Cl.
*G02B 6/10* (2006.01)
*G02B 6/136* (2006.01)
*G02B 6/12* (2006.01)

(52) U.S. Cl.
CPC ......... *G02B 6/136* (2013.01); *G02B 6/12004* (2013.01)

(58) Field of Classification Search
CPC ........................... G02B 6/136; G02B 6/12004
See application file for complete search history.

(56) References Cited

U.S. PATENT DOCUMENTS

| | | | | |
|---|---|---|---|---|
| 10,267,988 B2* | 4/2019 | Huang | ............ | G02B 6/34 |
| 10,509,169 B2* | 12/2019 | Chang | ............ | G02B 6/1228 |
| 2003/0190772 A1* | 10/2003 | Toyota | ............ | H01J 31/127 438/200 |
| 2014/0321801 A1* | 10/2014 | Ellis-Monaghan | .... | G02B 6/136 385/14 |
| 2019/0081067 A1* | 3/2019 | Eom | ............ | H01L 27/1157 |
| 2019/0088759 A1* | 3/2019 | Sung | ............ | H01L 29/4983 |
| 2019/0195797 A1* | 6/2019 | Cai | ............ | B01L 3/5085 |
| 2019/0369329 A1* | 12/2019 | Huang | ............ | G02B 6/30 |

\* cited by examiner

*Primary Examiner* — Ellen E Kim
(74) *Attorney, Agent, or Firm* — Maschoff Brennan

(57) ABSTRACT

A method for fabricating a photonic device is provided. The method includes forming an optical coupler and a waveguide structure connected to the optical coupler over a semiconductor substrate; forming a metal-dielectric stack over the optical coupler and the waveguide structure; etching a hole in the metal-dielectric stack and vertically overlapping the optical coupler; and forming a protection layer on a sidewall and a bottom of the hole.

20 Claims, 16 Drawing Sheets

PHOTONIC DEVICE AND FABRICATION METHOD THEREOF

BACKGROUND

In today's telecommunication network, optical fibers are typically chosen over electrical cablings to transmit information in the form of light from one place to another partially because of various advantageous characteristics of the optical fibers, for example, a higher bandwidth, a longer transmission distance, etc., when compared to the electrical cablings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
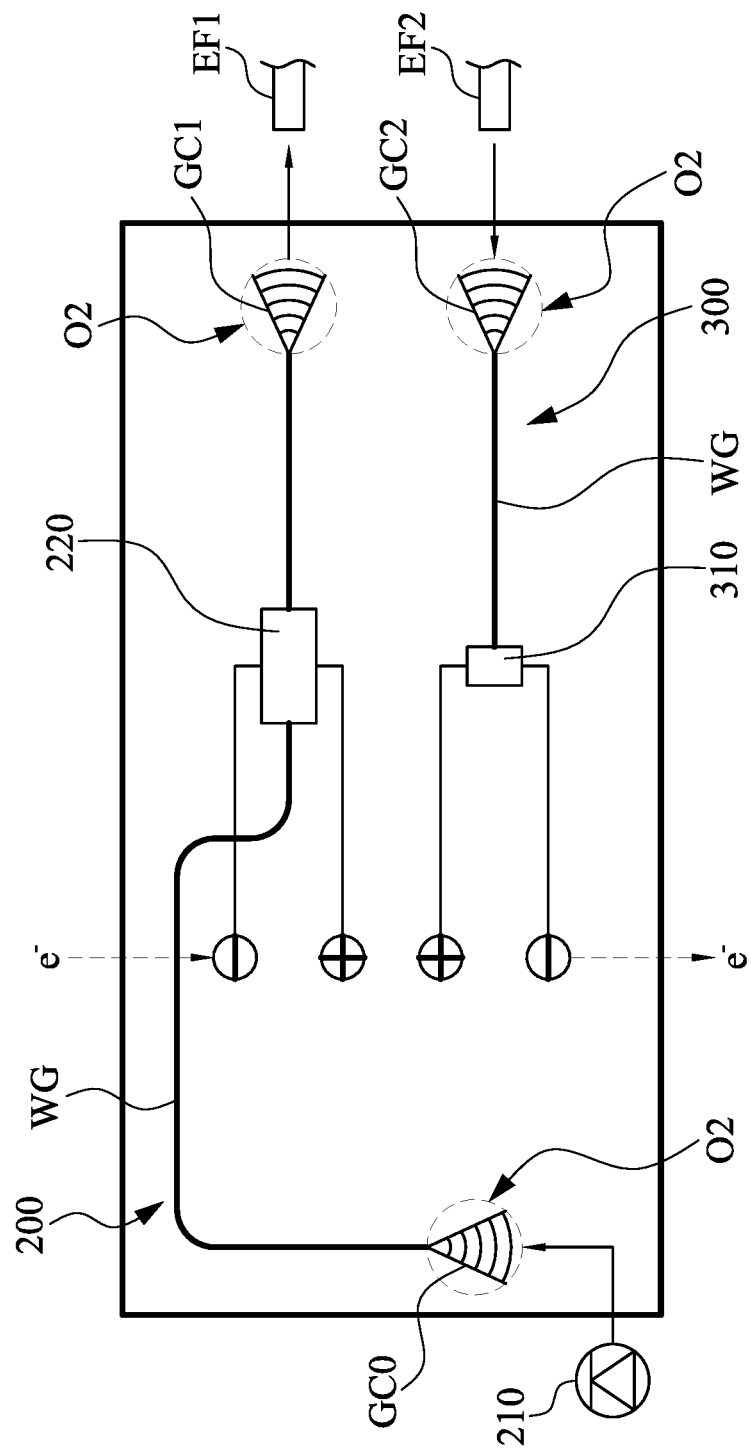
FIG. 1 is a schematic top view of a photonic device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Optical communication is a technique by which data signals can be transmitted from a transmitter to a receiver using optical fiber. An optical transmitter converts an electrical signal into an optical signal, which forms a carrier wave. The carrier wave is modulated with a modulation signal (i.e. the data), and is then transmitted along the optical fiber to a receiver, which converts the optical signal back into an electrical signal and recovers the transmitted data.

A photonic device and the methods of forming the same are provided in accordance with some embodiments of the present disclosure. The intermediate stages of manufacturing the photonic device are illustrated. Variations of the embodiments are also discussed. Throughout the various views and illustrative embodiments, like reference numbers are used to designate like elements.

FIG. 1 is a schematic top view of a photonic device 100 according to some embodiments of the present disclosure. The photonic device 100 may be a fiber-optical transceiver including a transmitter path 200 and a receiver path 300. It should be noted that, the transmitter path 200 and the receiver path 300 in FIG. 1 are shown in a simplified manner. Additional components, such as amplifier or switches, may be present in the transmitter path 200 and the receiver path 300 or between the transmitter path 200 and the receiver path 300.

In some embodiments, the transmitter path 200 includes an optical source 210, an optical coupler GC0, a modulator 220, an optical coupler GC1, and waveguides WG. The optical source 210 may be configured to provide an unmodulated light. For example, the optical source 210 may be a laser or other source. In the present embodiments, the optical coupler GC0 receives the unmodulated light from the optical source 210 and directs the unmodulated light into the waveguides WG, thereby sending the unmodulated light toward the modulator 220. The modulator 220 is optically coupled between the optical coupler GC0 and the optical coupler GC1 through the waveguides WG for adjusting the unmodulated light. For example, the modulator 220 is configured to modulate and adjust characteristics (e.g., modes) of the unmodulated light with a modulation signal (i.e. the data). After the modulation, another waveguide WG sends the modulated light toward the optical coupler GC1, thereby outputting the modulated light from the optical coupler GC1, for example, to an external fiber EF1. Additional component may be optically coupled between the optical coupler GC0 and the optical coupler GC1 through waveguides WG.

The receiver path 300 may include a photodetector 310, an optical coupler CG2, and waveguides WG. In the present embodiments, the photodetector 310 is optically coupled to the optical coupler GC2 through the waveguides WG. Through the configuration, the optical coupler GC2 may receive a light signal (e.g., from an external fiber EF2), and directs the light signal into the waveguides WG, thereby sending the light signal toward the photodetector 310. The photodetector 310 may convert light signals into electrical signals, which can then be amplified and processed. Additional components may be optically coupled between the optical coupler GC2 and the photodetector 310 through waveguides WG.

In some embodiments, the photodetector 310, the optical couplers GC0-GC2, and the waveguides WG may be fabricated over a semiconductor substrate and covered by one or more layers (e.g., multi-level interconnect structure fabricated in a back-end-of-line (BEOL) process), and plural optical coupler openings O2 are respectively formed in the layers above the optical couplers GC0-GC2 for optical coupling. For example, in some embodiments, light emitted from the optical source 210 is sent to the optical coupler GC0 through the opening O2. In some embodiments, light may exit from the optical coupler GC1 and then be sent to the external fiber EF1 through the opening O2. In some embodiments, light coming from the external fiber EF2 may be sent to the optical coupler GC2 through the opening O2. The optical coupler openings O2 are shown as dashed circles herein for brief illustration. In the context, the optical coupler openings O2 may also be referred to as optical coupler holes.

In the present embodiments, the transmitter path 200 and the receiver path 300 in combination form a fiber-optical transceiver on a chip. In some other embodiments, the transmitter path 200 may form a fiber-optical transmitter on one chip, while the receiver path 300 may form a fiber-optical receiver on another chip. The fabricating process of the photodetector 310, at least one of the optical couplers GC0-GC2, and the waveguides WG is exemplarily illustrated below.

FIGS. 2A-2E illustrate a method for fabricating a photonic device (e.g., the photonic device 100 in FIG. 1) at various intermediate stages of manufacture according to various embodiments of the present disclosure. For simplicity, some components of the photonic device are illustrated, while other components are omitted. The illustration is merely exemplary and is not intended to be limiting beyond what is specifically recited in the claims that follow. It is understood that additional operations may be provided before, during, and after the operations shown by FIGS. 2A-2E, and some of the operations described below can be replaced or eliminated for additional embodiments of the method. The order of the operations/processes may be interchangeable.

Figure 2A:
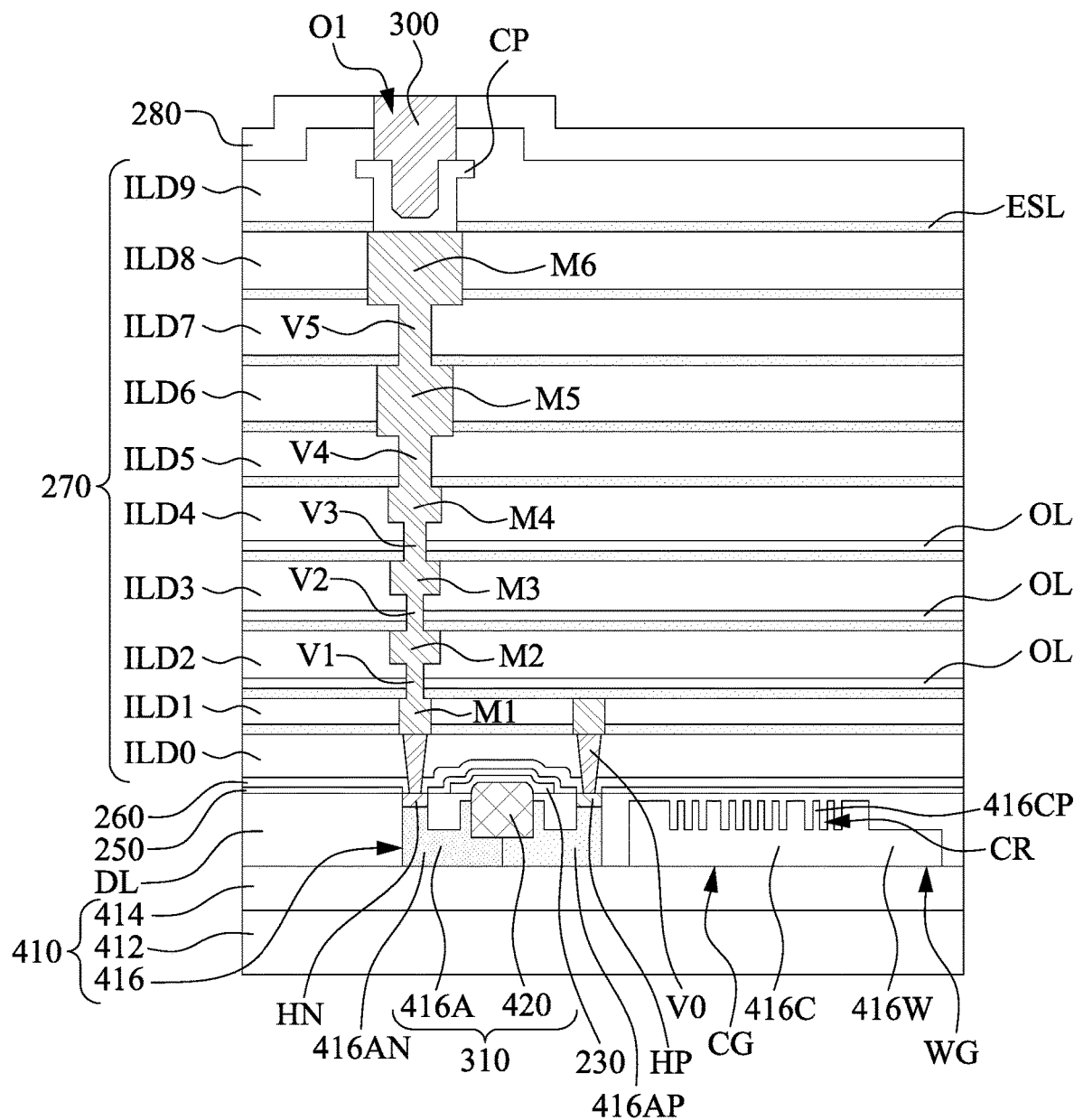
FIGS. 2A-2E illustrate a method for fabricating a photonic device at various intermediate stages of manufacture according to some embodiments of the present disclosure.

Reference is made to FIG. 2A. A semiconductor substrate 410 is provided, and a photodetector 310, a waveguide WG, and an optical coupler CG (e.g., any one of the optical couplers CG0-CG3 shown in FIG. 1) are formed over the semiconductor substrate 410. The semiconductor substrate 410 may be a silicon-on-insulator (SOI) substrate including a base substrate 412, an insulator layer 414 over the base substrate 412, and a semiconductor layer 416 over the insulator layer 414. The base substrate 412 may be a bulk substrate, such as bulk silicon substrate. The insulator layer 414 may include silicon oxide or other suitable insulating materials, and/or combinations thereof. In some embodiments, an insulator layer 414 may include a buried oxide layer (BOX) that is grown or deposited overlying the silicon base substrate 412. The semiconductor layer 416 may include an elementary semiconductor, such as silicon (Si) or germanium (Ge) in a crystalline structure; a compound semiconductor, such as silicon germanium (SiGe), silicon carbide (SiC), gallium arsenic (GaAs), gallium phosphide (GaP), indium phosphide (InP), indium arsenide (InAs), and/or indium antimonide (InSb); or combinations thereof. For example, the SOI substrates are fabricated using separation by implantation of oxygen (SIMOX), wafer bonding, and/or other suitable methods.

In some embodiments, the photodetector 310 includes a structure 416A patterned from the semiconductor layer 416 and an epitaxial semiconductor feature 420 over the structure 416A. The structure 416A may be doped to have a first doped region 416AN and a second doped region 416AP, in which the first doped region 416AN has a first conductive type (e.g., n-type) opposite to a second conductive type (e.g., p-type) of the second doped region 416AP. For example, the n-type dopants may include phosphorous, arsenic, antimony, or the like. For example, the p-type dopants may include boron, gallium, indium, or the like. In some embodiments, the first doped region 416AN may have an n-type doping concentration higher than about $10^{18}/cm^3$, and the second doped region 416AO may have a p-type doping concentration higher than about $10^{18}/cm^3$.

An intrinsic semiconductor feature 420 is epitaxially grown in a recess of the structure 416A. In the present embodiments, the intrinsic semiconductor feature 420 may include suitable pure semiconductor materials, such as germanium (Ge), or the like in some embodiments. For example, germanium has a cut-off wavelength near ~1.8 micrometers, and therefore may be a promising candidate for photo-detection in the field of optical communication. In some alternative embodiments, the intrinsic semiconductor feature 420 may include suitable semiconductor alloy materials, such as silicon germanium (SiGe). In some other embodiments, rather than a Ge or SiGe epitaxial material being grown for the intrinsic semiconductor feature 420, other materials, such as monocrystalline silicon, a binary semiconductor material (e.g., GaAs, InAs, InP, GaSb), tertiary semiconductor material (e.g., InGaAs), or other semiconductor material can be grown to form the intrinsic semiconductor feature 420. The deposition process may be chemical vapor deposition (CVD) techniques (e.g., vapor-phase epitaxy (VPE) and/or ultra-high vacuum CVD (UHV-CVD)), molecular beam epitaxy, and/or other suitable processes.

In some embodiments, the intrinsic semiconductor feature 420 is not intentionally doped, for example, not having intentionally diffused dopants. However, the intrinsic semiconductor feature 420 may be unintentionally doped due to processes for fabricating elements other than the intrinsic semiconductor feature 420. For example, the intrinsic semiconductor feature 420 is not intentional doped (NID) semiconductor layers and thus free from the dopants in the doped regions 416AN and 416AP. Alternatively, the intrinsic semiconductor feature 420 may be doped with a p-type or an n-type with a doping concentration lower than that of the doped regions 416AN and 416AP. For example, the intrinsic semiconductor feature 420 have dopant concentration lower than about $10^{13}/cm^3$.

The semiconductor feature 420 may have a material different from that of the underlying semiconductor structure 416A. For example, the semiconductor feature 420 may include germanium (Ge), silicon germanium (SiGe), or other suitable semiconductor material, and the semiconductor structure 416A may include silicon (Si). Through the configuration, the photodetector 310 may be a semiconductor PIN waveguide photodiode that exploits lateral Silicon/Germanium/Silicon (Si/Ge/Si) heterojunctions. Due to the refractive index difference between the semiconductor feature 420 (e.g., Ge or SiGe) and the structures 416A (e.g., Si), incoming light coupled from the waveguide structure 416W (e.g., Si) into the semiconductor feature 420 stays confined in the semiconductor feature 420, and does not spread out in the doped regions 416AN and 416AP, avoiding any deleterious absorption of photo-generated carriers. In some other embodiments, the semiconductor feature 420 may have the same material as that of the underlying semiconductor structure 416A. For example, the semiconductor feature 420 may include silicon as the underlying semiconductor structure 416A includes.

In some embodiments, the waveguide WG includes a waveguide structure 416W patterned from the semiconductor layer 416. The waveguide structure 416W has a higher refractive index than a refractive index of the insulator layer 414, and therefore acts as the waveguiding core. In some embodiments, the optical coupler CG includes a coupler structure 416C patterned from the semiconductor layer 416. The coupler structure 416C may be a grating that has plural protruding portions 416CP spaced apart by the trenches CR. The protruding portion 416CP may have suitable widths and pitches, such that the coupler structure 416C is capable of directing the incident light with desired angle to the waveguide structure 416W when receiving lights from a fiber or directing a modulated light from the waveguide structure 416W to a fiber. In some embodiments, the waveguide structure 416W connects the structure 416A to the coupler structure 416C as illustrated in FIG. 1, such that the photodetector 310 may receive the lights form the optical coupler CG.

A dielectric layer DL is formed surrounding and covering the structure 416A, the coupler structure 416C, and the waveguide structures 416W. In some embodiments, the dielectric layer DL may include an oxide (e.g., $SiO_2$), an ultra-low k dielectric material, a low-k dielectric material (e.g., SiCO), SiON, or the like. In some embodiments, the dielectric layer DL may be formed by a physical vapor deposition (PVD) process, chemical vapor deposition (CVD) process, flowable CVD process, atomic layer deposition (ALD), or other suitable process, or the combination thereof. In some embodiments, a refractive index of the material of the waveguide structure 416W is higher than a refractive index of the material of the dielectric layer DL. Due to the difference in refractive indices of the materials of the waveguide structure 416W and dielectric layer DL, the waveguide structure 416W have high internal reflections such that light is confined in the waveguide structure 416W, depending on the wavelength of the light and the reflective indices of the respective materials. Through the configuration, the waveguide structure 416W may have a strong optical confinement because it is surrounded by the insulator layer 414 and a low-index material (e.g., the dielectric layer DL).

A capping layer 230 may formed to cover a top surface of the semiconductor feature 420 and the dielectric layer DL, thereby protecting the semiconductor feature 420 from being exposed. The capping layer 230 may include suitable dielectric materials, such as silicon oxide, silicon nitride, silicon oxynitride, silicon nitrogen hydride (SiNH), the combination thereof, or the like.

A resist protection oxide (RPO) layer 250 is conformally formed over the capping layer 230 and the dielectric layer DL. Then, an interlayer dielectric (ILD) layer ILD0 is formed over the RPO layer 250. In some embodiments, the ILD layer ILD0 may include an oxide (e.g., $SiO_2$), an ultra-low k dielectric material, a low-k dielectric material (e.g., SiCO), or the like. The ILD layer ILD0 may be an un-doped silicate glass (USG) or fluorosilicate glass (FSG) layer. In some embodiments, the ILD layer ILD0 may be formed by a vapor deposition process. In some embodiments, prior to the formation of the ILD layer ILD0, an etch stop layer 260 is conformally formed. The etch stop layer 260 may include suitable material different from that of the ILD layer ILD0 and the RPO layer 250. For example, in the present embodiments, the etch stop layer 260 may include silicon nitride, silicon oxynitride, silicon carbide, or the like.

Conductive contacts V0 are formed to connect the first doped region 416AN and the second doped region 416AP. In some embodiments, implantation processes may be performed to the exposed portions of the first doped region 416AN and the second doped region 416AP, thereby forming highly doped contact regions HN and HP in the first doped region 416AN and the second doped region 416AP, respectively. The highly doped contacts regions HN and HP in the first doped region 416AN and the second doped region 416AP may improve the ohmic contacts between the conductive contacts V0 and the semiconductor structure 416A. In some embodiments, the highly doped contact region HN has the first conductive type (e.g., n-type). For example, the dopants implanted into the highly doped contact region HN may be n-type dopants, such as phosphorous, arsenic, antimony, or the like. In some embodiments, the highly doped contact region HP has the second conductive type (e.g., p-type). For example, the dopants implanted into the highly doped contact region HP may be p-type dopants, such as boron, gallium, indium, or the like. The conductive contacts V0 may include one or more conductive materials. In some embodiments, the one or more conductive materials may include tungsten (W), aluminum (Al), titanium (Ti), titanium nitride (TiN), and/or tantalum nitride (TaN). In some embodiments, a diffusion barrier layer and/or a liner layer may be deposited into the contact openings prior to depositing the one or more conductive materials.

A metal-dielectric stack (interchangeably referred to as multi-level interconnect structure) 270 is formed over the ILD layer ILD0, and connecting the conductive contacts V0. The metal-dielectric stack 270 includes plural ILD layers ILD1-ILD9 and a metallization pattern (e.g., plural metal layers M1-M6 and plural metal vias V1-V5) embedded in the ILD layers ILD1-ILD9. In some embodiments, the ILD layers ILD1-ILD9 may include an oxide (e.g., $SiO_2$), an ultra-low k dielectric material, a low-k dielectric material (e.g., SiCO), or the like. The ILD layers ILD1-ILD9 may include un-doped silicate glass (USG), hard black diamond (HBD), fluorosilicate glass (FSG), or the like. The metal layers M1-M6 and the metal vias V1-V5 are in the ILD layers ILD1-ILD9, in which each of the metal vias V1-V5 is connected between the two adjacent metal layers M1-M6. In some embodiments, the metal layers M1-M6 and the metal vias V1-V5 may include suitable metallic material such as aluminum, aluminum alloy, copper, copper alloy, titanium, titanium nitride, tantalum, tantalum nitride, tungsten, the like, and/or combinations thereof. Formation of the metal-dielectric stack 270 may be a dual-damascene process and/or a single-damascene process. Although the exemplary embodiments described herein depict six metal layers and five metal vias, this is merely illustrative and it should be understood that the photonic device may alternatively be formed with more or fewer metal layers and metal vias, depending on the application.

In some embodiments, etch stop layers ESL may be formed between adjacent two of the ILD layers ILD1-ILD9 for protecting the underlying material from being etched when etching trenches or vias for the formation of the metal layers M1-M6 and the metal vias V1-V5. The etch stop layers ESL may include suitable material other than that of the ILD layers ILD1-ILD9. For example, the etch stop layers ESL may include silicon carbide, silicon nitride, silicon oxynitride, the combination thereof, or the like. Oxide layers (e.g., tetraethoxysilane (TEOS) layers) OL may be optionally formed over some of the etch stop layers ESL in some embodiments.

After the formation of the metal-dielectric stack 270, a passivation layer 280 is formed over the ILD layer ILD9, and an opening O1 is then etched in the passivation layer 280 and the ILD layer ILD9. A contact pad CP may be formed over the metal layer M6. The contact pad CP may include suitable conductive materials, such as copper, aluminum, the combination thereof, or the like. A conductive feature 300 may formed in the opening O1 over the contact pad CP to connect the metal layer M6. The conductive feature 300 may include suitable conductive materials, such as aluminum. The conductive feature 300 may be a connector, such as conductive bumps, solder balls, etc. Through the conductive feature 300, electrical components (not shown), such as dies, may be electrically connected to the metal layer M6.

Figure 2B:
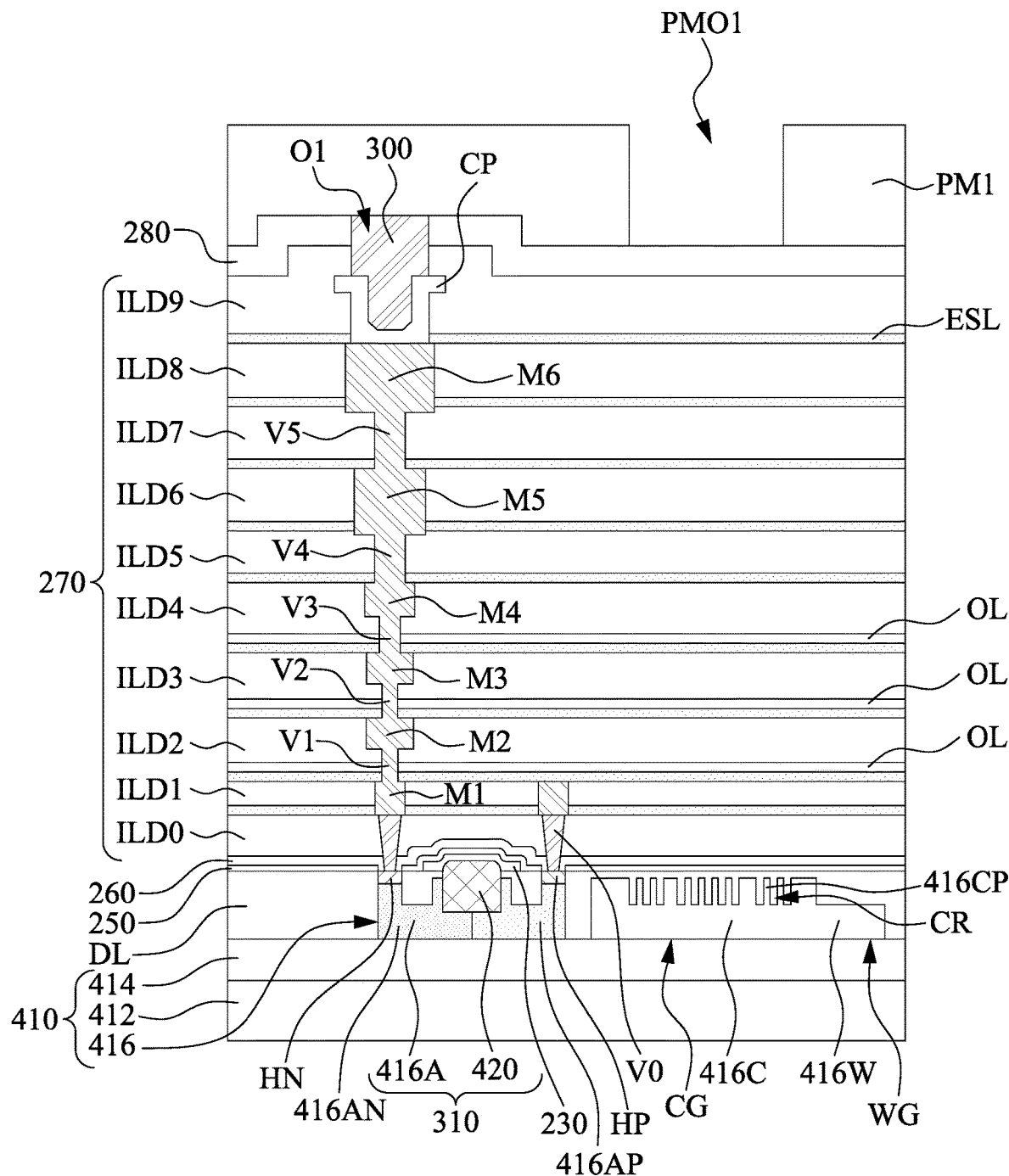

Reference is made to FIG. 2B. A patterned mask PM1 is formed over the metal-dielectric stack 270 and the passivation layer 280. The patterned mask PM1 has an opening PMO1 aligned with the coupler structure 416C. The patterned mask PM1 may include suitable organic material, such as photoresist. For example, a photoresist is coated over the metal-dielectric stack 270 and the passivation layer 280 and then patterned using photolithography techniques to have the opening PMO1 exposing portions of the passivation layer 280, thereby forming the patterned mask PM1.

Figure 2C:
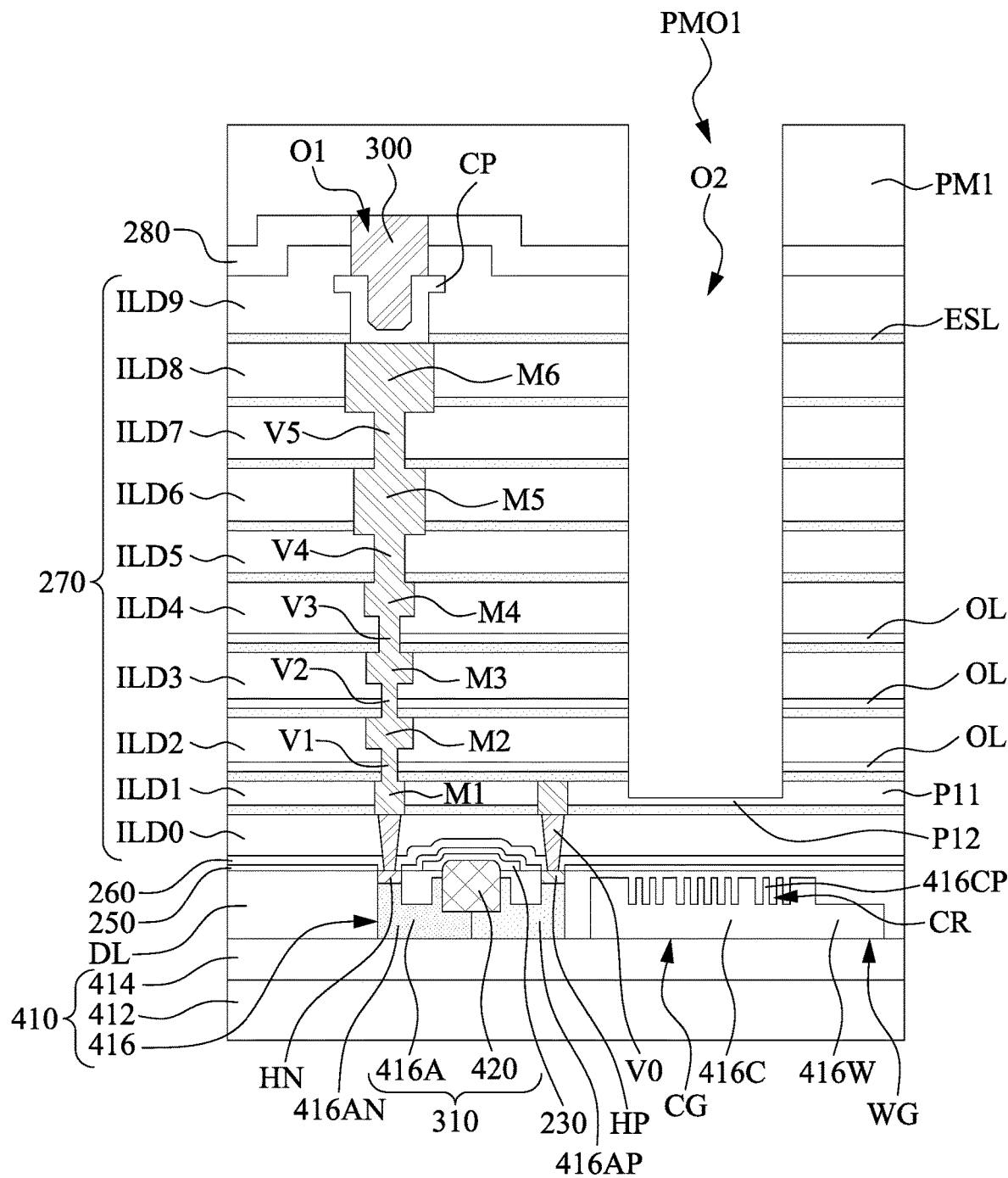

Reference is made to FIG. 2C. One or more etching processes are performed to remove portions of the ILD layers ILD1-ILD9, the etch stop layers ESL, and the oxide layers OL through the opening PMO1 of the patterned mask PM1, thereby forming an opening O2 vertically overlapping the coupler structure 416C in the metal-dielectric stack 290. The patterned mask PM1 may serve as an etch mask during the etching process. The etching process may include wet etch, dry etch, or the combination thereof. For example, the etching process may include a dry etch using gas etchants such as $C_4F_8$, $CF_4$, $C_5F_8$, Ar, $O_2$, the combination thereof, or the like. The etching process may be performed such that a top surface of the ILD layer ILD1 is exposed. In the present embodiments, sidewalls of the ILD layer ILD1-ILD9, etch stop layers ESL, and the oxide layers OL may be exposed by the opening O2. The opening O2 may be used as a light path or waveguide to introduce light to the coupler structure 416C. In some embodiments, the opening O2 has a rectangular cross-sectional profile with two parallel sidewalls perpendicular to a top surface of the semiconductor substrate 410. In some other embodiments, the opening O2 has a tapered profile, in which a width at a top of the opening O2 is wider than a width at a bottom of the opening O2.

In some embodiments, the depth of the opening O2 may be designed according to product requirement, thereby improving coupling efficiency. For example, in the present embodiments, the etching process may be controlled such that the opening O2 exposes a portion P12 of the ILD layer ILD1, and the exposed portion P12 of the ILD layer ILD1 is recessed and therefore thinner than other portions P11 of the ILD layer ILD1. Through the configuration, a light source or a fiber may be optically coupled to the coupler structure 416C through the recessed portion P12 of the ILD layer ILD1, the underlying etch stop layer ESL, the ILD layer ILD0, the layers 250, 260, and the dielectric layer DL.

Figure 2D:
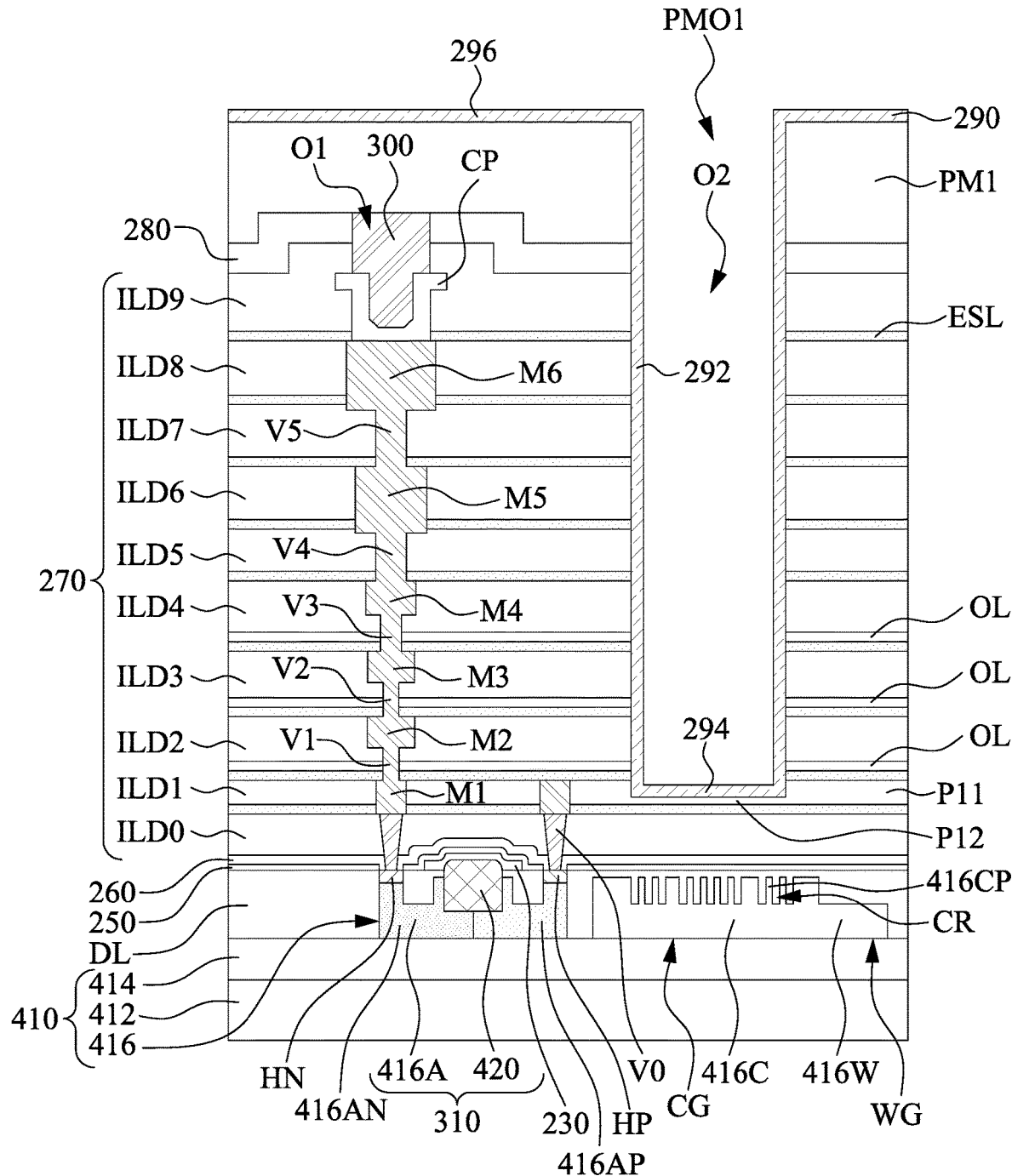

Reference is made to FIG. 2D. A protection film 290 is conformally depositing over the structure of FIG. 2C. The protection film 290 may include suitable dielectric materials, such as silicon oxide, silicon nitride, silicon oxynitride, or the like. In some embodiments, the oxide of the protection film 290 may be undoped. The deposition process may include CVD or the like. In some embodiments, a material of the protection film 290 is chosen such that a refractive index of the protection film 290 is similar to that of the underlying layer (e.g., the portion P12 of the ILD layer ILD1 in the present embodiments), such that light may enter the underlying layer (e.g., the portion P12 of the ILD layer ILD1) without interface reflection. For example, a difference between the refractive index of the protection film 290 and the refractive index of the ILD layer ILD1 is less than about 0.1. In some embodiments, the protection film 290 and the underlying layer (e.g., ILD layer ILD1) may include the same material, such as silicon oxide. In some embodiments, the protection film 290 and the underlying layer (e.g., ILD layer ILD1) may include suitable low-k materials. In some other embodiments, the protection film 290 and the underlying layer (e.g., ILD layer ILD1) may include different materials.

Through the deposition process, the protection film 290 may has portions 292 on the sidewalls of the opening O2, a portion 294 on a bottom of the opening O2, and a portion 296 out of the opening O2. For example, in some embodiments the portion 292 is in contact with the sidewalls of the ILD1-ILD9, the etch stop layer ESL, and the oxide layer IL. In some embodiments, the portion 294 is in contact with the exposed top surface of the portion P12 of the ILD layer ILD1. In some embodiments, the portion 296 of the protection film 290 is over a top surface and sidewalls of the patterned mask PM1.

Figure 2E:
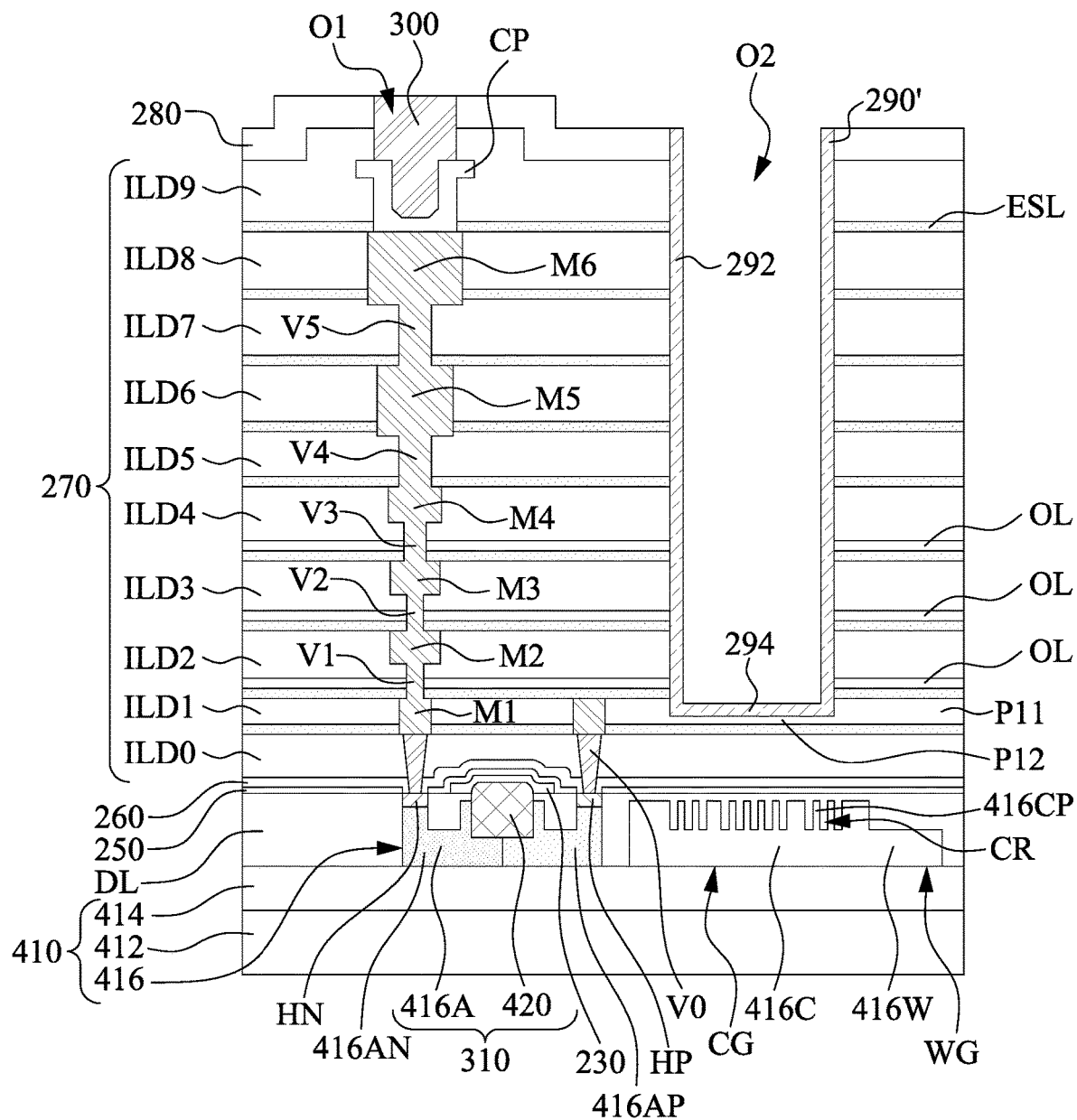

Reference is made to FIG. 2E. The patterned mask PM1 (referring to FIG. 2D) is removed by suitable ashing process, such that the portion 296 of the protection film 290 (referring to FIG. 2D) is also removed. Through the configuration, the portions 292 and 294 of the protection film 290 remains and serve as a protection layer 290'. The protection layer 290' may passivate the sidewalls of the opening O2 and the bottom of the opening O2.

In some cases, due to the etch selectivity among the etch stop layers ESL, the oxide layers OL, and the ILD layers ILD1-ILD9, the etching process for forming the opening O2 may result in weak points (e.g., peeling and/or small gaps) at the sidewalls of the opening O2 at the interface between adjacent two of the etch stop layers ESL, the oxide layers OL, and the ILD layers ILD1-ILD9. In absence of the protection layer 290', moisture may penetrate the ILD layers ILD1-ILD and the oxide layers OL from these weak points, and therefore damages the metal layers M1-M6 and the metal vias V1-V5 in the metal-dielectric stack 270.

In the present embodiments, the protection layer 290' passivates the exposed sidewalls of the etch stop layers ESL, the oxide layers OL, and the ILD layers ILD1-ILD9, thereby protecting the weak points from being exposed to moisture in air. Through the configuration, moisture may not penetrate the ILD layers ILD1-ILD and the oxide layers OL from the weak points, thereby protecting the metal layers M1-M6 and the metal vias V1-V5 from moisture.

Figure 3A:
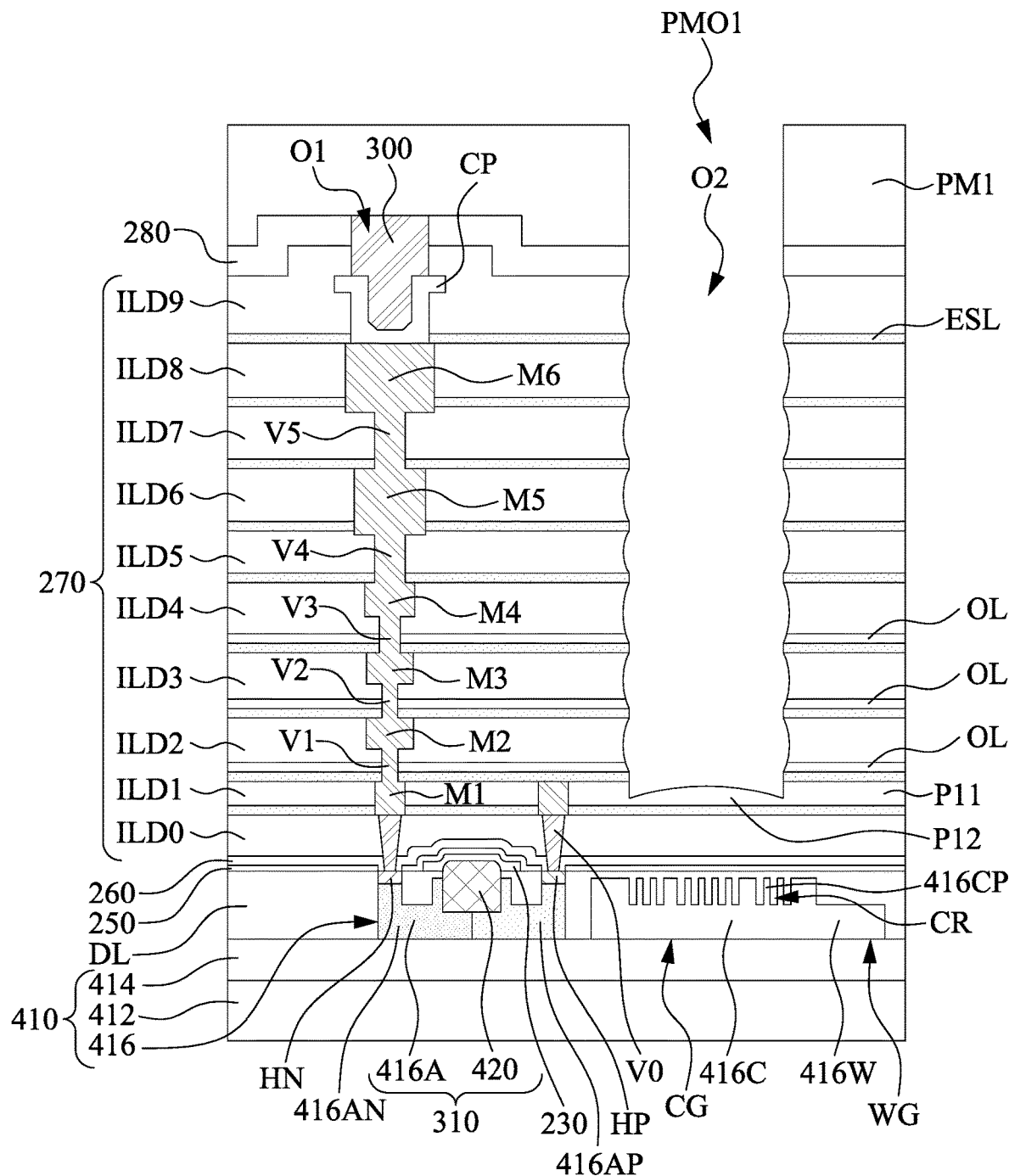
FIGS. 3A-3B illustrate a method for fabricating a photonic device at various intermediate stages of manufacture according to some embodiments of the present disclosure.
Figure 3B:
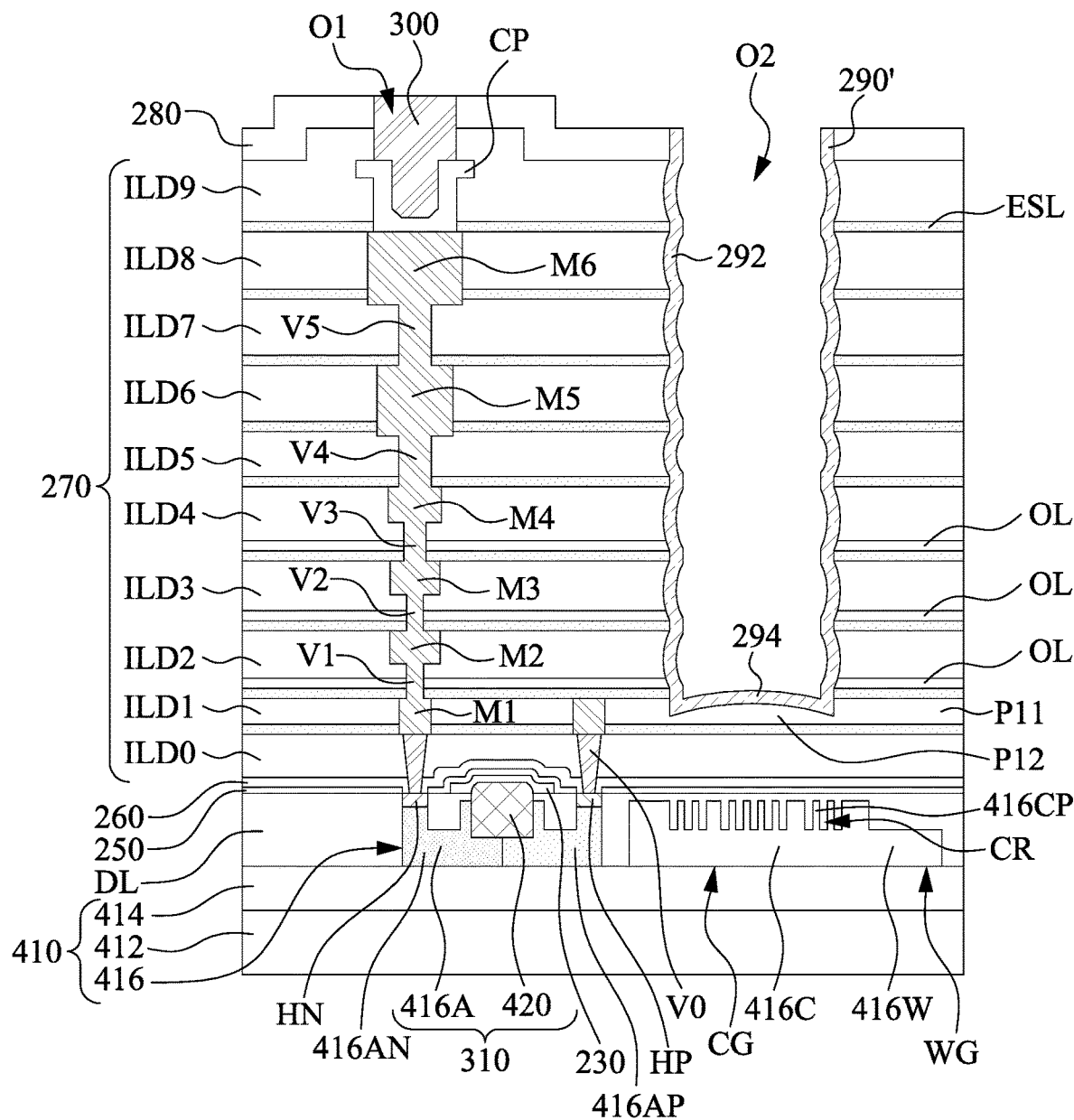

FIGS. 3A-3B illustrate a method for fabricating a photonic device (e.g., the photonic device 100 in FIG. 1) at various intermediate stages of manufacture according to various embodiments of the present disclosure. The present embodiments are similar to those illustrated in the embodiments of FIG. 2A-2E, except the profile of the opening O2 and the protection layer 290'.

Reference is made to FIG. 3A. One or more etching processes are performed to remove portions of the ILD layers ILD1-ILD9, the etch stop layers ESL, and the oxide layers OL through the opening PMO1 of the patterned mask PM1, thereby forming an opening O2 vertically overlapping the coupler structure 416C. The etching process may be performed such that a top surface of the ILD layer ILD1 is exposed. In the present embodiments, since the etch stop layer ESL may have a higher etch resistance to the etching process than the oxide layers OL and the ILD layers ILD1-ILD9 during the formation of the opening O2, the sidewalls of the ILD layers ILD1-ILD9 and the oxide layers OL may be recessed more than the sidewalls of the etch stop layers ESL. For example, the sidewalls of the ILD layers ILD1-ILD9 and the oxide layers OL are recessed and concave. Furthermore, in some embodiments, during the formation of the opening O2, an etch rate at edge may be greater than the etch rate at center, such that the formed opening O2 may have a convex bottom. For example, the portion P12 of the ILD layer ILD1 has a convex top surface exposed by the opening O2 herein. The formation of the opening O2 may be similar to the process illustrated in the embodiments of FIG. 2C, and therefore not repeated herein.

Reference is made to FIG. 3B. A protection layer 290' is formed on sidewalls and the bottom of the opening O2. The protection layer 290' may have a conformal profile as that of the sidewalls and the bottom of the opening O2. For example, the portion 292 of the protection layer 290' may have recesses according to the recesses on sidewalls of the opening O2 (e.g., the exposed sidewalls of the ILD layers ILD1-ILD9, the etch stop layers ESL, and the oxide layers), and the portion 294 of the protection layer 290' may have a convex top surface according to the bottom of the opening O2 (e.g., the convex top surface of the portion P12 of the ILD layer ILD1). The formation of the protection layer 290' may be similar to the process illustrated in the embodiments of FIGS. 2D-2E, and therefore not repeated herein.

FIGS. 4A-4D illustrate a method for fabricating a photonic device (e.g., the photonic device 100 in FIG. 1) at various intermediate stages of manufacture according to various embodiments of the present disclosure. The present embodiments are similar to those illustrated in the embodiments of FIG. 2A-2E, except the formation process of the protection layer 290'.

Figure 4A:
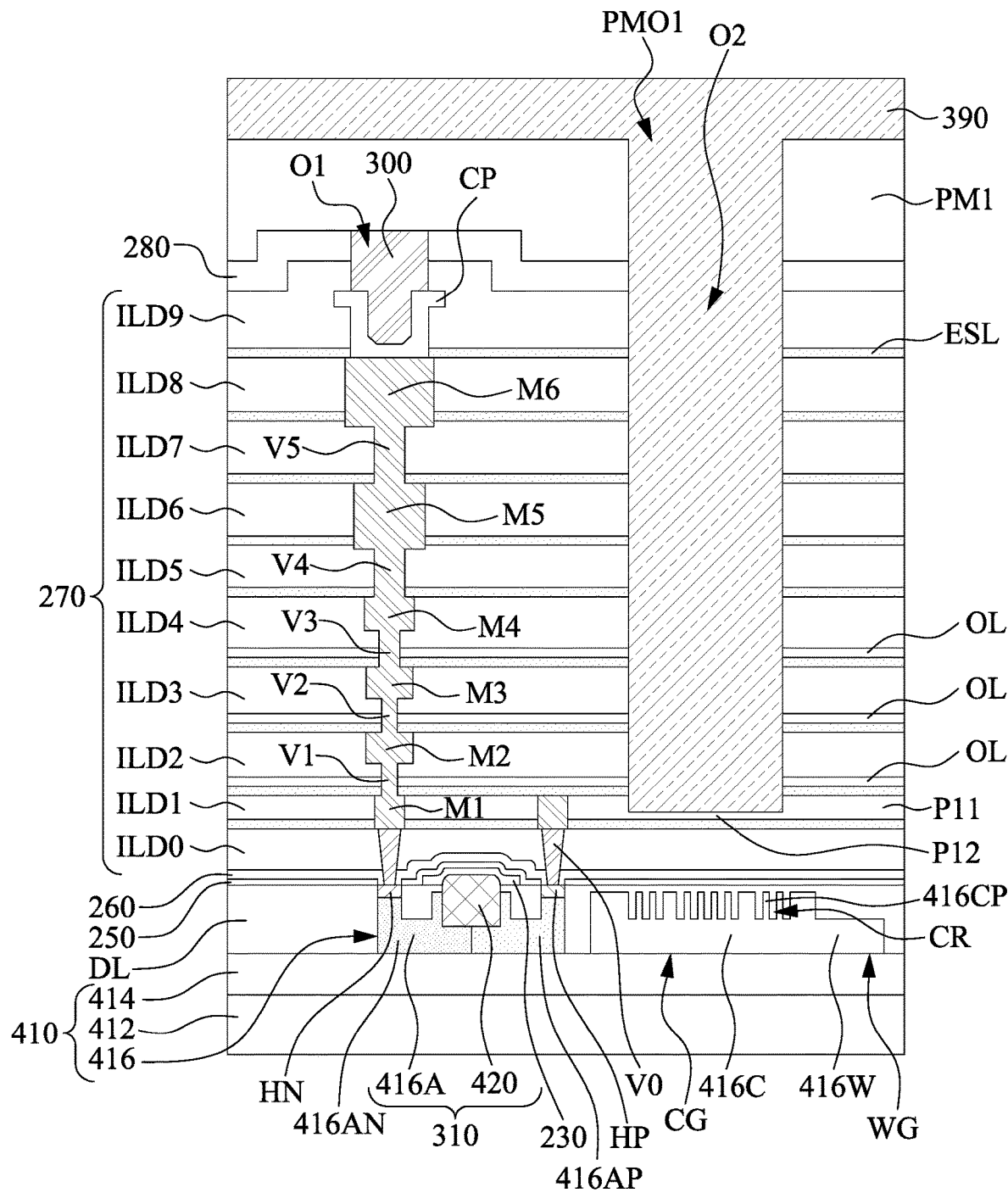
FIGS. 4A-4D illustrate a method for fabricating a photonic device at various intermediate stages of manufacture according to some embodiments of the present disclosure.

Reference is made to FIG. 4A. After the formation of the opening O2 as shown in FIG. 2C, a protection filling material 390 is deposited over the patterned mask PM1, thereby filling the opening O2 and the opening PMO1 of the patterned mask PM1. The protection filling material 390 may include suitable dielectric materials, such as silicon oxide, silicon nitride, silicon oxynitride, or the like. The deposition process may include CVD or the like. In some embodiments, a material of the protection filling material 390 is chosen such that a refractive index of the protection filling material 390 is similar to that of the underlying layer (e.g., ILD layer ILD1 in the present embodiments). For example, a difference between the refractive index of the protection filling material 390 and the refractive index of the ILD layer ILD1 is less than about 0.1. In some embodiments, the protection filling material 390 and the underlying layer (e.g., the portion P12 of ILD layer ILD1 in the present embodiments) may include the same material, such as silicon oxide. In some embodiments, the protection filling material 390 and the underlying layer (e.g., the portion P12 of ILD layer ILD1 in the present embodiments) may include suitable low-k materials. In some other embodiments, the protection filling material 390 and the underlying layer (e.g., the portion P12 of ILD layer ILD1) may include different materials.

Figure 4B:
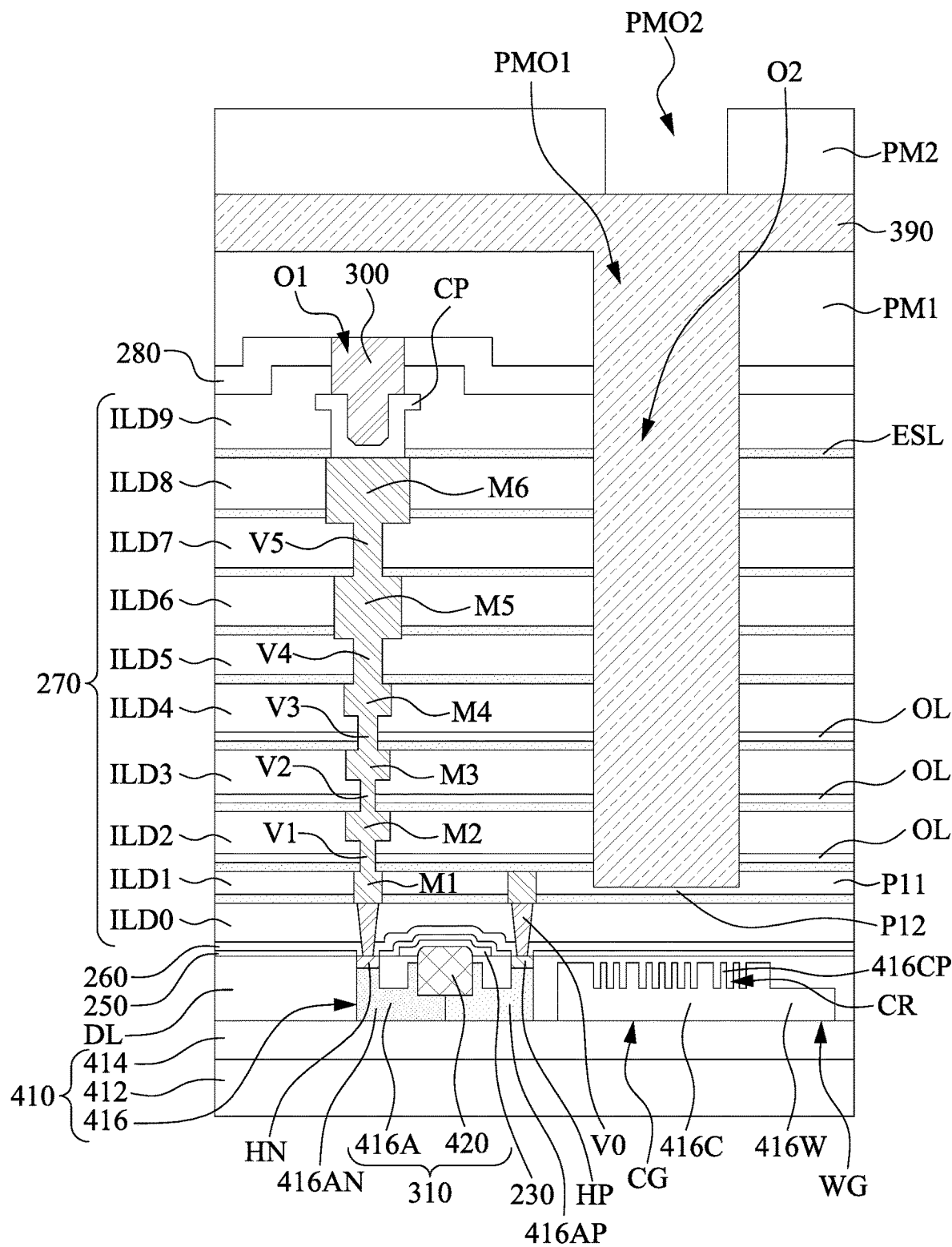

Reference is made to FIG. 4B. A patterned mask PM2 is formed over the protection filling material 390. The patterned mask PM2 has an opening PMO2 aligning with respect to the opening O2. The patterned mask PM2 may include suitable organic material, such as photoresist. For example, a photoresist is coated over the protection filling material 390 and then patterned using photolithography techniques to have the opening PMO2 exposing portions of the protection filling material 390, thereby forming the patterned mask PM2.

Figure 4C:
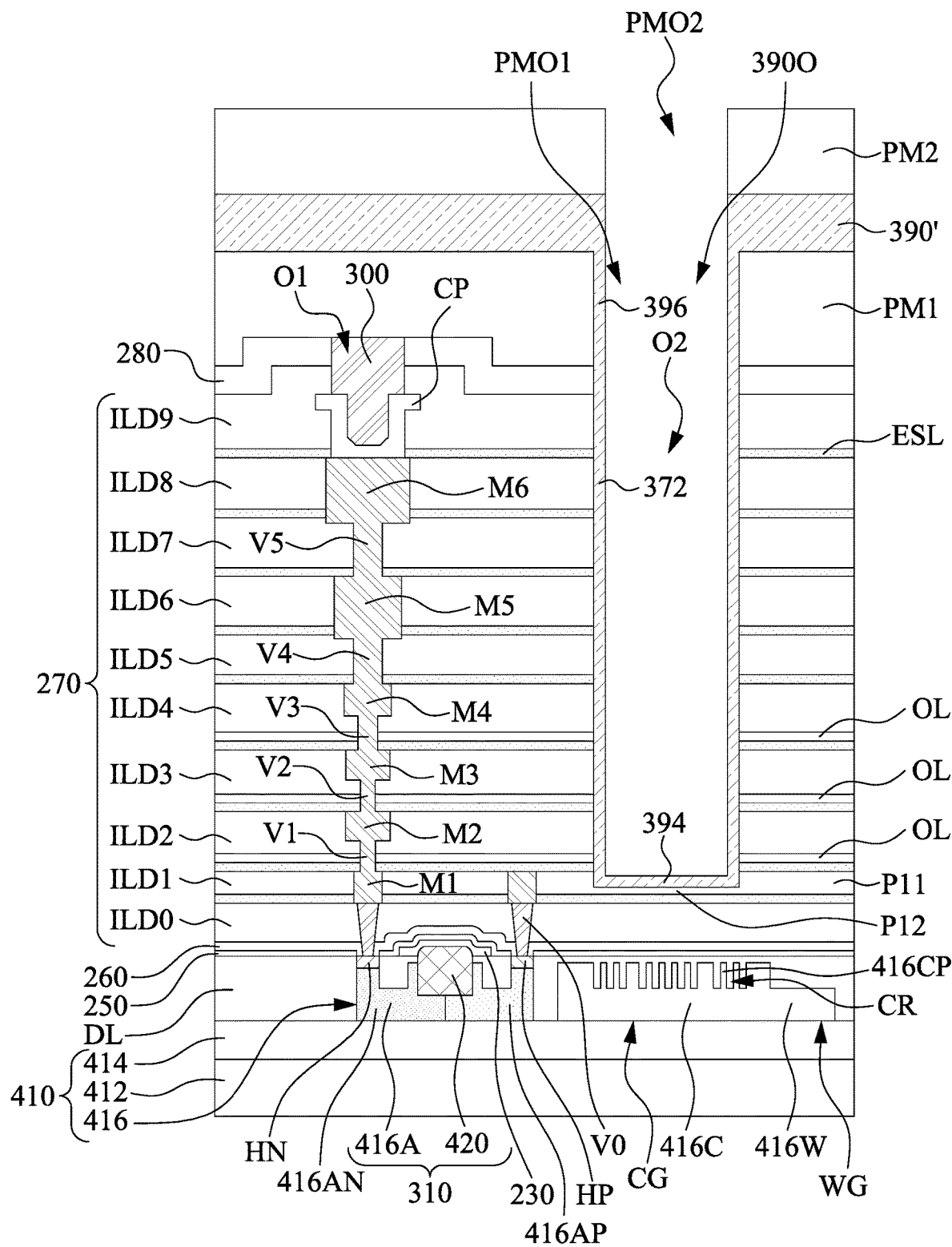

Reference is made to FIG. 4C. One or more etching processes are performed to remove portions of the protection filling material 390 (referring to FIG. 4B) through the opening PMO2 of the patterned mask PM2, thereby forming a protection hole 390O in the protection filling material 390 (referring to FIG. 4B). Parameters of the etching processes are controlled such that a remaining portion of the protection filling material 390 (referring to FIG. 4B) forms a protection layer 390'. In some embodiments, the protection layer 390' includes a portion 392 covering the sidewalls of the opening O2, a portion 394 covering the bottom of the opening O2, and a portion 396 out of the opening O2. For example, the portion 396 of the protection layer 390' is over a top surface and sidewalls of the patterned mask PM1.

Figure 4D:
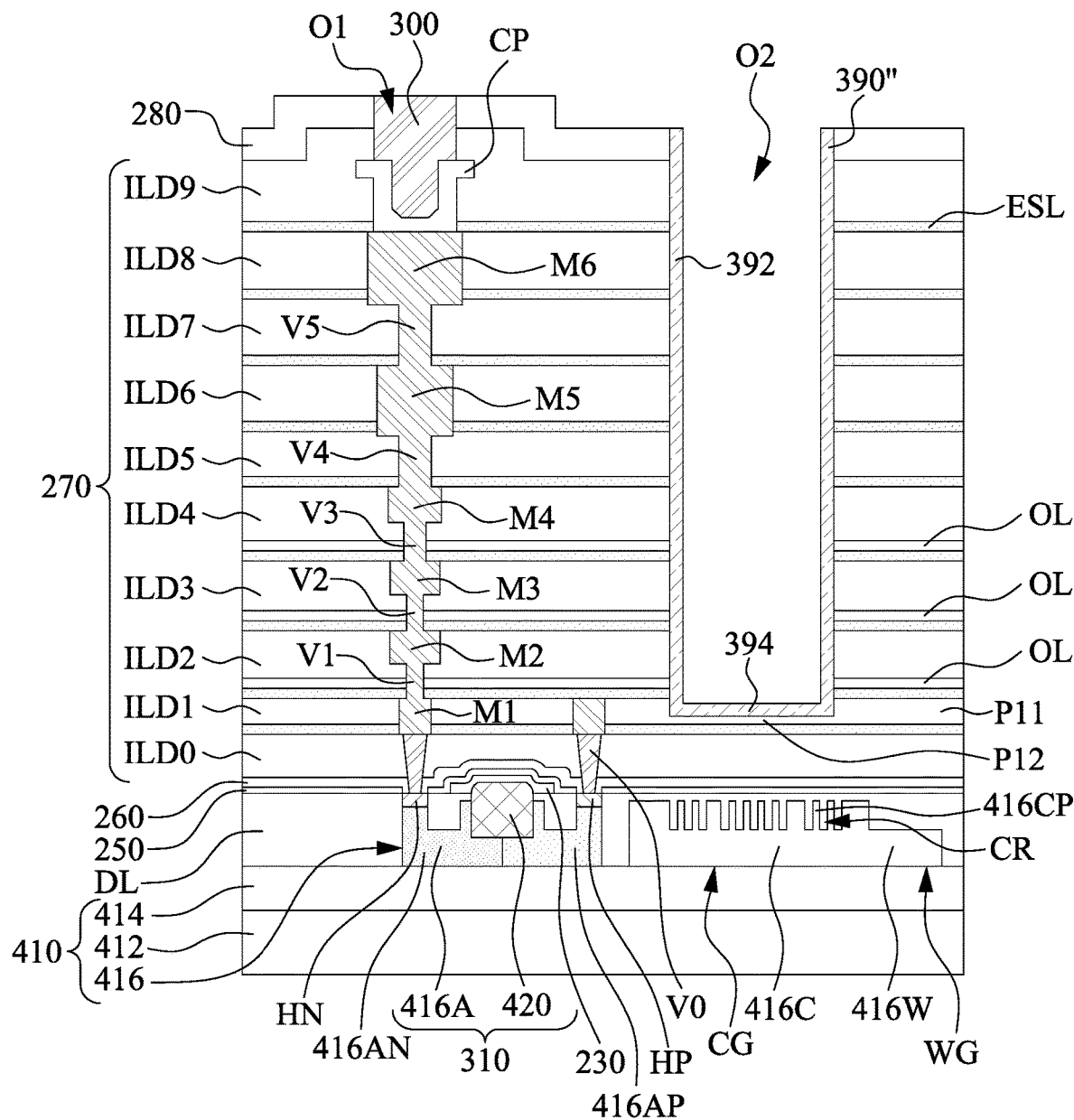

Reference is made to FIG. 4D. After the etching processes, the patterned masks PM1 and PM2 are removed by suitable ashing processes, such that the portion 396 of the protection layer 390' (referring to FIG. 4C) out of the opening O2 is also removed. Through the configuration, the portions 392 and 394 of the protection layer 390' remains (referring to FIG. 4C) and serve as a protection layer 390". The protection layer 390" may passivate the sidewalls of the opening O2 and the bottom of the opening O2.

Figure 5:
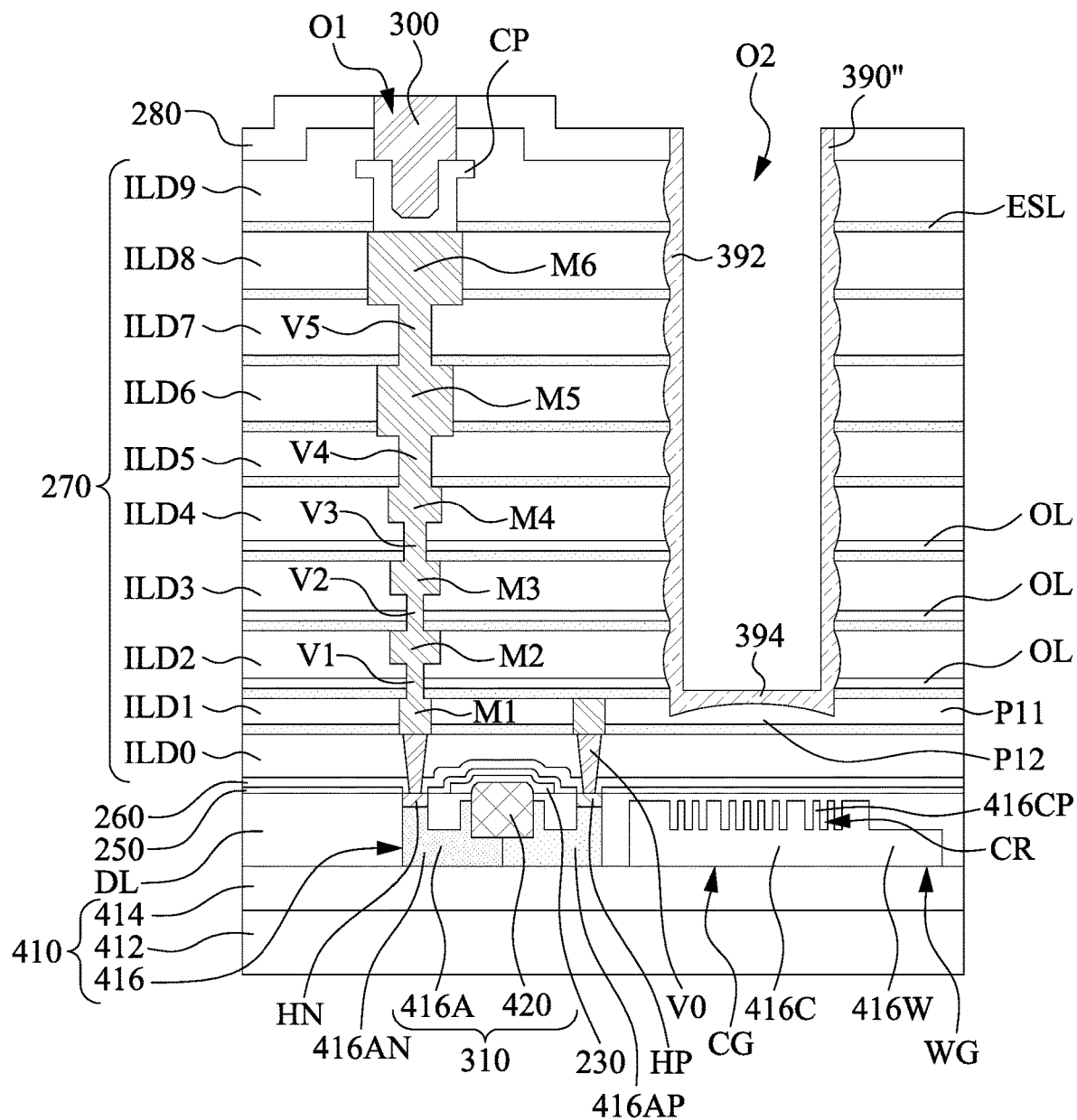
FIG. 5 is a cross-sectional view of a photonic device according to some embodiments of the present disclosure.

FIG. 5 is a cross-sectional view of a photonic device according to some embodiments of the present disclosure. The present embodiments are similar to those illustrated in the embodiments of FIG. 4A-4D, except the profile of the opening O2 and the protection layer 390". In the present embodiments, since the etch stop layer ESL may have a higher etch resistance to the etching process than other ILD layers ILD1-ILD9 and oxide layers OL during the formation of the opening O2, the sidewalls of the formed opening O2 may have recesses. Furthermore, in some embodiments, during the formation of opening O2, the etch rate at edge may be greater than the etch rate at center, such that the formed opening O2 may have a convex bottom. For example, the portion P12 of the ILD layer ILD1 has a convex top surface exposed by the opening O2 herein.

In the present embodiments, the protection layer 390" is non-conformally formed on sidewalls and the bottom of the opening O2, such that the inner surfaces of the protection layer 390" may have a profile different from that of the sidewalls and the bottom of the opening O2. For example, in the present embodiments, the portion 392 of the protection layer 390" have substantially flat inner sidewalls, and the portion 394 of the protection layer 390" have a substantially planar top surface. The formation of the protection layer 390" may be similar to the process illustrated in the embodiments of FIGS. 4A-4D, and therefore not repeated herein.

Figure 6:
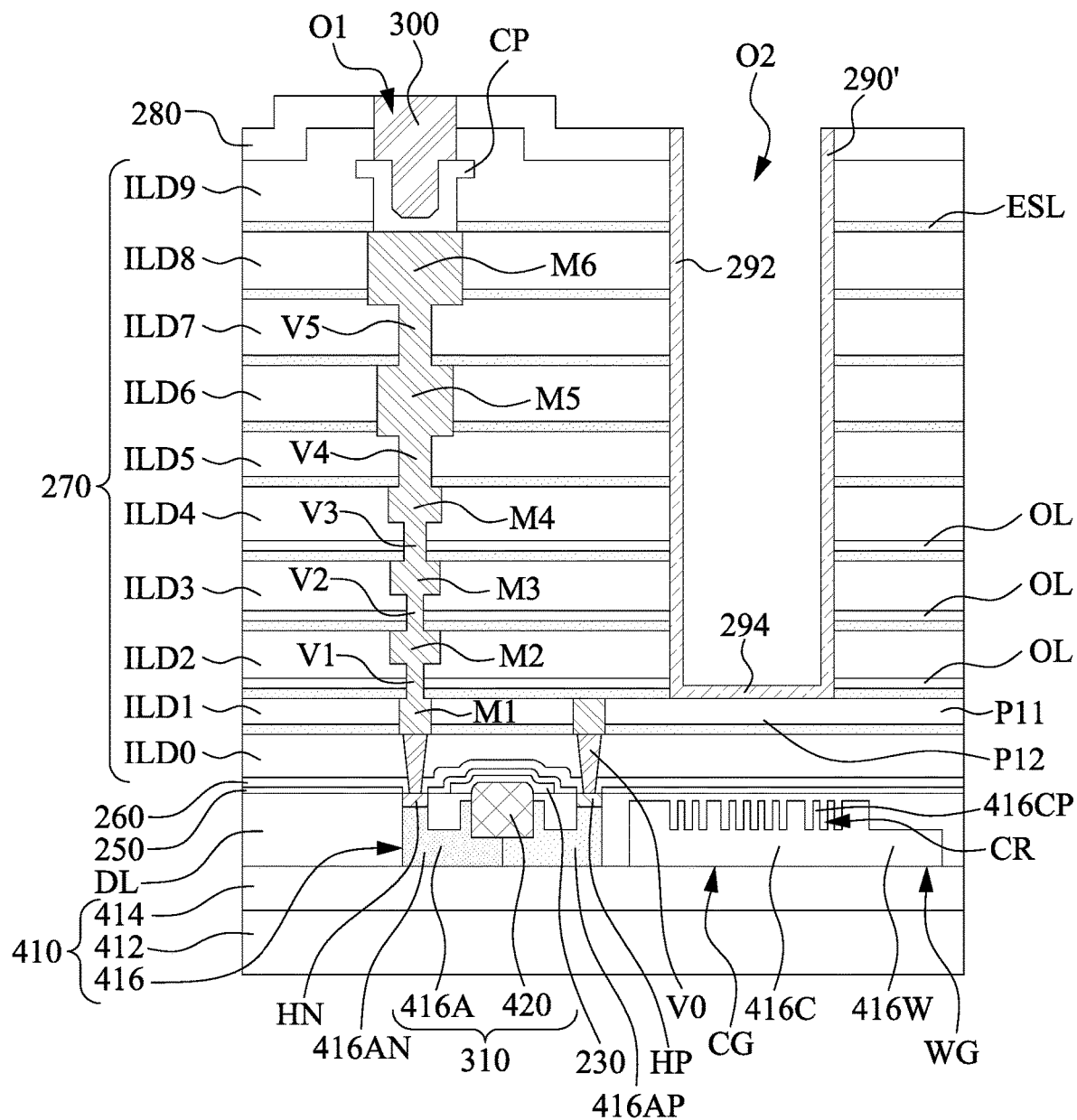
FIG. 6 is a cross-sectional view of a photonic device according to some embodiments of the present disclosure.

FIG. 6 is a cross-sectional view of a photonic device according to some embodiments of the present disclosure. The present embodiments are similar to those illustrated in the embodiments of FIGS. 2A-2E or the embodiments of FIGS. 4A-4D, except the depth of the opening O2. In the present embodiments, the etching process may be controlled such that the exposed portion P12 of the ILD layer ILD1 may not be recessed. For example, the exposed portion P12 of the ILD layer ILD1 may have substantially the same thickness as that of other portions P11 of the ILD layer ILD1. Through the configuration, a light source or a fiber may be optically coupled to the coupler structure 416C through the portion 292 of the protection layer 290', the unrecessed portion P12 of the ILD layer ILD1, the underlying etch stop layer ESL, the ILD layer ILD0, the layers 250, 260, and the dielectric layer DL. In the present embodiments, the protection layer 290' may be formed by the process shown in the embodiments of FIGS. 2A-2E. In some other embodiments, the protection layer 290' may be formed by the process shown in the embodiments of FIGS. 4A-4D and therefore referred to as the protection layer 390''. Other details of the present embodiments are similar to those aforementioned, and therefore not repeated herein.

Figure 7:
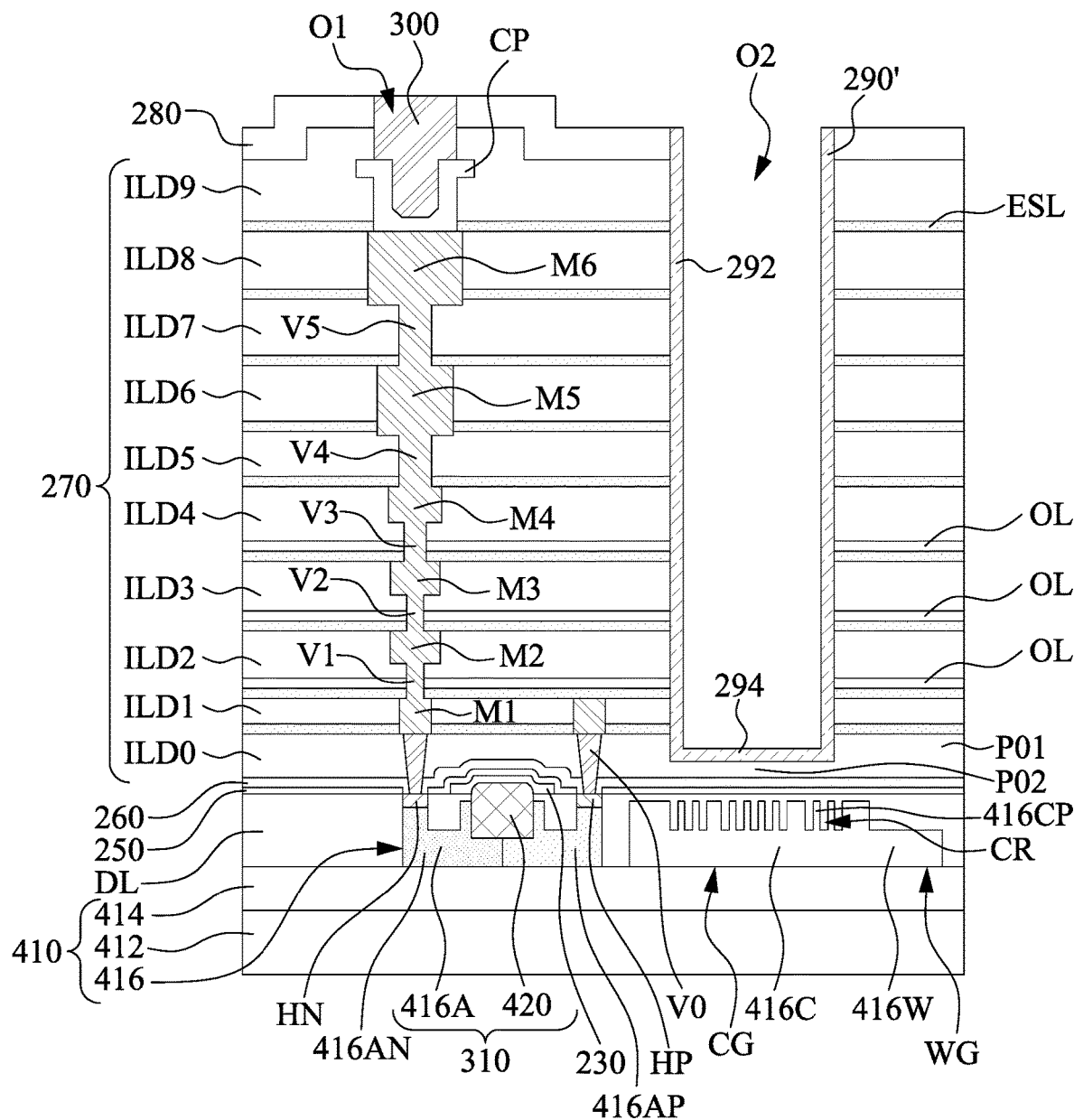
FIG. 7 is a cross-sectional view of a photonic device according to some embodiments of the present disclosure.

FIG. 7 is a cross-sectional view of a photonic device according to some embodiments of the present disclosure. The present embodiments are similar to those illustrated in the embodiments of FIG. 2A-2E or the embodiments of FIG. 4A-4D, except the depth of the opening O2. In the present embodiments, the opening O2 extends to the ILD layer ILD0, and the formed protection layer 290' may be in contact with a top surface of the ILD layer ILD0. In the present embodiments, the etching process may be controlled such that the opening O2 exposes a portion P02 of the ILD layer ILD0, and the exposed portion P02 of the ILD layer ILD0 is recessed and therefore thinner than other portions P01 of the ILD layer ILD0. Through the configuration, a light source or a fiber may be optically coupled to the coupler structure 416C through the portion 292 of the protection layer 290', the recessed portion P02 of the ILD layer ILD0, the layers 250, 260, and the dielectric layer DL.

In some embodiments, a material of the protection layer 290' is chosen such that a refractive index of the protection layer 290' is similar to that of the underlying layer (e.g., the portion P02 of the ILD layer ILD0 in the present embodiments), such that light may enter the underlying layer (e.g., the portion P02 of the ILD layer ILD0) without interface reflection. For example, a difference between the refractive index of the protection layer 290'' and the refractive index of the ILD layer ILD0 is less than about 0.1. In some embodiments, the protection layer 290' and the underlying layer (e.g., ILD layer ILD0) may include the same material, such as silicon oxide. In some other embodiments, the protection layer 290' and the underlying layer (e.g., ILD layer ILD0) may include different materials. In the present embodiments, the protection layer 290' may be formed by the process shown in the embodiments of FIGS. 2A-2E. In some other embodiments, the protection layer 290' may be formed by the process shown in the embodiments of FIGS. 4A-4D and therefore referred to as the protection layer 390''. Other details of the present embodiments are similar to those aforementioned, and therefore not repeated herein.

Figure 8:
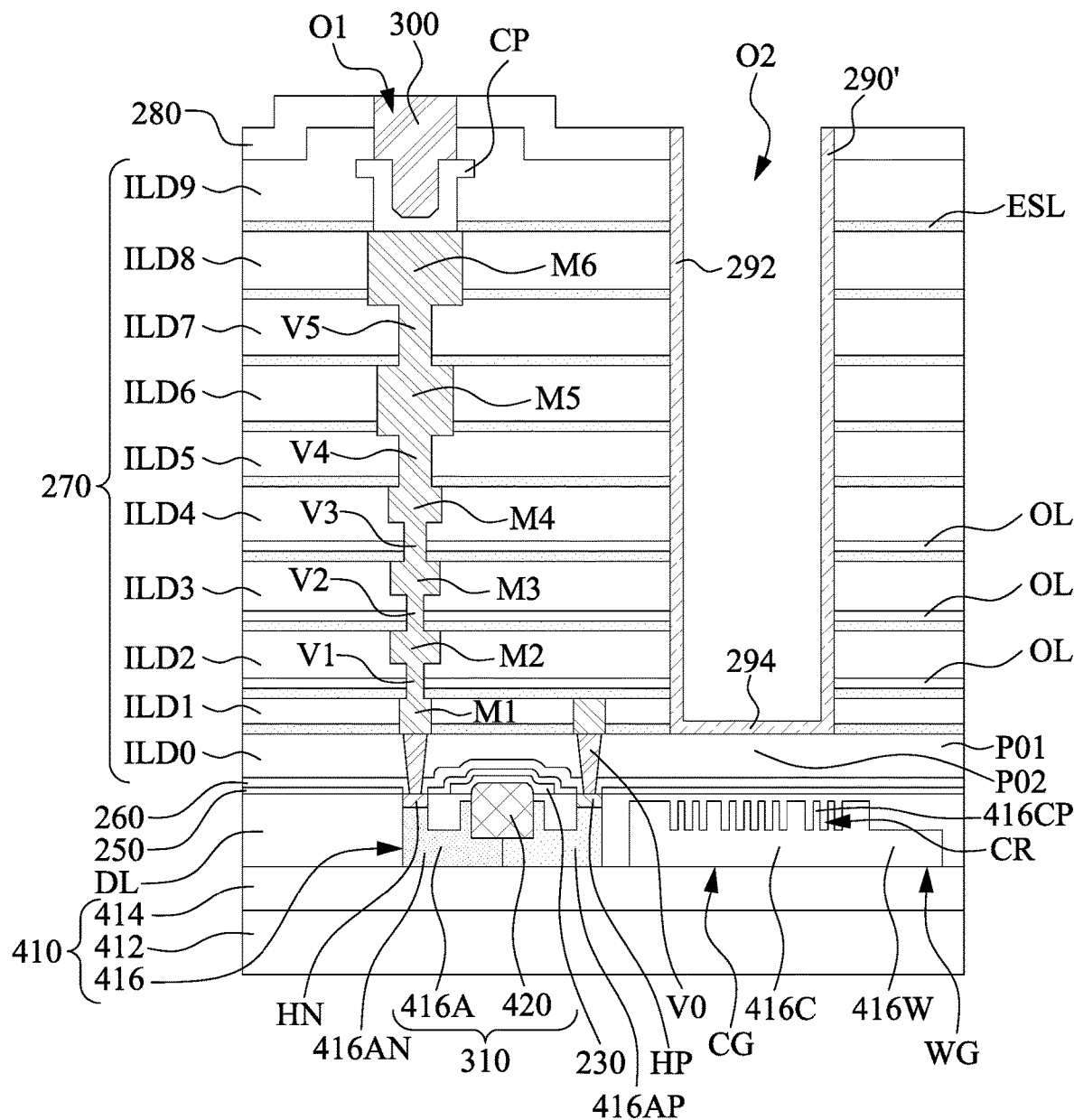
FIG. 8 is a cross-sectional view of a photonic device according to some embodiments of the present disclosure.

FIG. 8 is a cross-sectional view of a photonic device according to some embodiments of the present disclosure. The present embodiments is similar to those illustrated in the embodiments of FIG. 7, except the depth of the opening O2. In the present embodiments, the etching process may be controlled such that the exposed portion P02 of the ILD layer ILD0 is not recessed. For example, the exposed portion P02 of the ILD layer ILD0 may have a thickness substantially the same as that of other portions P01 of the ILD layer ILD0. Through the configuration, a light source or a fiber may be optically coupled to the coupler structure 416C through the portion 292 of the protection layer 290', the unrecessed portion P02 of the ILD layer ILD0, the layers 250, 260, and the dielectric layer DL. Other details of the present embodiments are similar to the embodiments of FIG. 7, and therefore not repeated herein.

Based on the above discussions, it can be seen that the present disclosure offers advantages to the photonic device. It is understood, however, that other embodiments may offer additional advantages, and not all advantages are necessarily disclosed herein, and that no particular advantage is required for all embodiments. One advantage is that a protection layer is formed in the optical coupler opening for passivating sidewalls of etch stop layer and ILD layers, such that moisture may not penetrate the ILD layers from weak points, thereby protecting the metallization pattern from moisture. Another advantage is that a material of the protection layer is chosen to reduce interface reflection between the protection layer and the underlying layer, thereby improving the coupling efficiency.

According to some embodiments of the present disclosure, a method for fabricating a photonic device is provided. The method includes forming an optical coupler and a waveguide structure connected to the optical coupler over a semiconductor substrate; forming a metal-dielectric stack over the optical coupler and the waveguide structure; etching a hole in the metal-dielectric stack and vertically overlapping the optical coupler; and forming a protection layer on a sidewall and a bottom of the hole.

According to some embodiments of the present disclosure, a method for fabricating a photonic device is provided. The method includes forming an optical coupler and a waveguide structure connected to the optical coupler over a semiconductor substrate; forming a first dielectric layer over the optical coupler and the waveguide structure; forming a etch stop layer over the first dielectric layer; forming a second dielectric layer over the etch stop layer; etching a hole in at least the etch stop layer and the second dielectric layer above the optical coupler, such that a sidewall of the etch stop layer and a sidewall of the second dielectric layer are exposed by the hole; and forming a protection layer on the exposed sidewall of the etch stop layer and the exposed sidewall of the second dielectric layer.

According to some embodiments of the present disclosure, a photonic device includes an optical coupler, a waveguide structure, a metal-dielectric stack, and a protection layer. The waveguide structure is connected to the optical coupler. The metal-dielectric stack is over the optical coupler and the waveguide structure, in which the metal-dielectric stack has a hole above the optical coupler. The protection layer has a first portion over a sidewall of the hole.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for fabricating a photonic device, comprising:

forming an optical coupler and a waveguide structure connected to the optical coupler over a semiconductor substrate;

forming a metal-dielectric stack over the optical coupler and the waveguide structure;
etching a hole in the metal-dielectric stack and vertically overlapping the optical coupler; and
forming a protection layer on a sidewall and a bottom of the hole, wherein a metallization pattern of the metal-dielectric stack is free from coverage of the protection layer along a direction normal to a top surface of the semiconductor substrate.

2. The method of claim 1, wherein etching the hole is performed such that a top surface of a dielectric layer of the metal-dielectric stack is exposed by the hole, and forming the protection layer is performed such that the protection layer is in contact with the top surface of the dielectric layer.

3. The method of claim 2, where forming the protection layer is performed such that the protection layer has the same material as that of the dielectric layer.

4. The method of claim 2, wherein forming the protection layer is performed such that a difference between a refractive index of the protection layer and a refractive index of the dielectric layer is less than about 0.1.

5. The method of claim 1, wherein the protection layer is made of a low-k material.

6. The method of claim 1, further comprising:
forming a patterned mask over the metal-dielectric stack prior to etching the hole in the metal-dielectric stack, wherein etching the hole is performed with the patterned mask in place.

7. The method of claim 6, wherein forming the protection layer comprises:
depositing a protection film over the patterned mask after etching the hole; and
removing a portion of the protection film out of the hole.

8. The method of claim 6, wherein forming the protection layer comprises:
depositing a protection material over the patterned mask to fill the hole in the metal-dielectric stack after etching the hole;
etching a protection hole in the protection material above the optical coupler; and
removing a portion of the protection material out of the hole in the metal-dielectric stack.

9. The method of claim 1, further comprising:
forming a photodetector over the semiconductor substrate prior to the forming the metal-dielectric stack, wherein forming the metal-dielectric stack is performed such that the metallization pattern of the metal-dielectric stack is connected to the photodetector.

10. A method for fabricating a photonic device, comprising:
forming an optical grating coupler and a waveguide structure connected to the optical grating coupler over a semiconductor substrate, wherein the optical grating coupler has a plurality of protruding semiconductor portions spaced apart from each other;
forming a first dielectric layer over the optical grating coupler and the waveguide structure;
forming an etch stop layer over the first dielectric layer;
forming a second dielectric layer over the etch stop layer;
etching a hole in at least the etch stop layer and the second dielectric layer above the optical grating coupler, such that a sidewall of the etch stop layer and a sidewall of the second dielectric layer are exposed by the hole; and
forming a protection layer on the exposed sidewall of the etch stop layer and the exposed sidewall of the second dielectric layer.

11. The method of claim 10, wherein forming the protection layer is performed such that the protection layer is conformal to the exposed sidewall of the etch stop layer and the exposed sidewall of the second dielectric layer.

12. The method of claim 10, wherein etching the hole is performed such that the exposed sidewall of the second dielectric layer is recessed more than the exposed sidewall of the etch stop layer.

13. The method of claim 10, wherein forming the protection layer is performed such that the protection layer is in contact with a top surface of the first dielectric layer.

14. The method of claim 13, further comprising:
forming a photodetector over the semiconductor substrate prior to the forming the first dielectric layer, wherein forming the first dielectric layer is performed such that the first dielectric layer comprises a conductive contact connected to the photodetector.

15. The method of claim 13, further comprising:
forming a photodetector over the semiconductor substrate prior to the forming the first dielectric layer, wherein forming the first dielectric layer is performed such that the first dielectric layer comprises a metal layer electrically connected to the photodetector.

16. A photonic device, comprising:
an optical coupler over a semiconductor substrate;
a photodetector over the semiconductor substrate;
a waveguide structure over the semiconductor substrate and extending from the optical coupler to the photodetector;
a metal-dielectric stack over the optical coupler and the waveguide structure, wherein the metal-dielectric stack has a hole above the optical coupler; and
a protection layer having a first portion over a sidewall of the hole.

17. The photonic device of claim 16, wherein the metal-dielectric stack has a first dielectric layer, a second dielectric layer, and an etch stop layer between the first dielectric layer and the second dielectric layer, wherein the protection layer is in contact with a sidewall of the first dielectric layer, a sidewall of the second dielectric layer, and a sidewall of the etch stop layer.

18. The photonic device of claim 16, wherein the protection layer further has a second portion over a bottom of the hole.

19. The photonic device of claim 18, wherein the metal-dielectric stack has a dielectric layer in contact with the second portion of the protection layer, and a difference between a refractive index of the protection layer and a refractive index of the dielectric layer is less than about 0.1.

20. The photonic device of claim 18, wherein the second portion of the protection layer has a convex top surface in the hole in the metal-dielectric stack.

* * * * *